United States Patent [19]

Kondo et al.

[11] Patent Number: 5,342,533
[45] Date of Patent: Aug. 30, 1994

[54] REFRIGERATOR OIL COMPOSITION

[75] Inventors: Yasuo Kondo; Yukiharu Beppu; Kazuo Tagawa, all of Kanagawa, Japan

[73] Assignees: Mitsubishi Oil Co., Ltd.; Mitsubishi Denki Kabushiki Kaisha, both of Tokyo, Japan

[21] Appl. No.: 940,196

[22] Filed: Sep. 2, 1992

[30] Foreign Application Priority Data

Sep. 3, 1991 [JP] Japan ................. 3-250524

[51] Int. Cl.⁵ ............... C09K 5/04; C10M 105/32
[52] U.S. Cl. .................... 252/68; 252/56 D; 252/67
[58] Field of Search ..................... 252/67, 68

[56] References Cited

U.S. PATENT DOCUMENTS

| 4,454,052 | 6/1984 | Shoji et al. ............... 252/68 |
| 4,557,850 | 12/1985 | Ando et al. ............... 252/68 |
| 4,755,316 | 7/1988 | Magid et al. ............... 252/67 |
| 4,851,144 | 7/1989 | McGraw et al. ............. 252/67 |
| 4,959,169 | 9/1990 | McGraw et al. ............. 252/68 |
| 5,008,028 | 4/1991 | Jolley et al. ............... 252/68 |
| 5,049,292 | 9/1991 | Grasshoff et al. ........... 252/68 |
| 5,096,606 | 3/1992 | Hagihara et al. ............ 252/68 |

FOREIGN PATENT DOCUMENTS

| 406479 | 1/1991 | European Pat. Off. . |
| 470788 | 2/1992 | European Pat. Off. . |
| 480479 | 4/1992 | European Pat. Off. . |
| 1062596 | 3/1986 | Japan . |
| 2292895 | 12/1987 | Japan . |
| 3156899 | 6/1988 | Japan . |

Primary Examiner—Ellen M. McAvoy
Attorney, Agent, or Firm—Sughrue, Mion, Zinn, Macpeak & Seas

[57] ABSTRACT

Disclosed is a refrigerator oil composition for compressors using hydrofluorocarbons as a refrigerant, comprising (a) a base oil component of a dibasic acid diester and/or a carboxylate of a polyhydric alcohol, and optionally a mineral oil and/or an alkylbenzene, and (b) a phosphate and/or a phosphite, the content of which is from 5.0 to 90.0% by mass of a dibasic acid diester and/or a carboxylate of a polyhydric alcohol in the base oil component. The composition is used as a lubricating oil in refrigerators using, as a refrigerant, hydrofluorocarbons which are substitutes for halogen-containing refrigerants. Using the composition, formation of sludge in high temperature parts may be prevented. The composition is free from wear and has good compatibility with refrigerants, and it is used for a long period of time under high-temperature and high-pressure conditions.

5 Claims, 1 Drawing Sheet

5,342,533

REFRIGERATOR OIL COMPOSITION

FIELD OF THE INVENTION

The present invention relates to a refrigerator oil composition and, more precisely, to one which is free from the formation and adhesion of sludge in the high temperature area of compressors, such as the sliding surfaces or discharge parts thereof, and which has an excellent lubricative property.

BACKGROUND OF THE INVENTION

Various types of refrigerators are applied to various appliances, such as freezers, room air conditioners, car air conditioners and others, for cooling them and for controlling their temperature. In general, vapor compression type refrigerators in which a halogen-containing refrigerants is used in a reciprocating type, turbo type and rotary type compressor are widely used in view of their ease and safety in use.

A refrigerator oil is used as a lubricating oil in vapor compression type refrigerators to prevent wear of the sliding parts of the compressor and reduce friction between them. In the pressure elevating step in which the refrigerator oil is exposed to a high-temperature and high-pressure refrigerant atmosphere, the refrigerator oil also has, in addition to the wear retarding purpose, other roles such as cooling the sliding surfaces, discharging the heat generated by vapor compression, sealing in the vapor compression stroke and removing wear particles and impurities.

Therefore, a refrigerator oil must have excellent lubricating properties such as high wear resistance and high load carrying capacity. Additionally, to achieve high thermal stability and chemical stability when used with refrigerants, insulating materials and metal parts, without having any bad influence on the parts constituting the refrigerating system. Where a refrigerator oil is used in a refrigerator, a part of it flows into a compressed refrigerant vapor and circulates through the system of the refrigerator to low-temperature parts such as capillaries or expansion valves and evaporator. Therefore, for the purpose of elevating the refrigerating effect and of improving the return of the oil from the low-temperature parts to the compressor, and for the purpose of feeding the oil to the sliding parts in low-temperature re-starting of the compressor, the refrigerator oil must have both low-temperature fluidity and compatibility with the refrigerant in the system.

Hitherto, fluoromethanes (such as trichloro-monofluoromethane (CFC-11), dichloro-difluoromethane (CFC-12) and monochloro-difluoromethane (HCFC-22)) as specified by JIS K1517, as well as fluoroethanes (such as trichlorotrifluoroethane (CFC-113), dichlorotetrafluoroethane (CFC-114)) as specified by JIS K1528 and monochloropentafluoroethane (CFC-115) have been used as halogen-containing refrigerants, either singly or in combination of two or more.

These refrigerants all have one or more chlorine atoms in the molecule and are compatible with hydrocarbon oils, though each has a different solubility. Therefore, in refrigerating system of using such refrigerants, a refrigerator oil is used as specified by JIS K2211, (1) which comprises a base oil selected from suitably refined naphthene mineral oils, paraffin mineral oils, alkylbenzenes and poly-α-olefines and mixtures thereof and antioxidant, anti-wear agent, corrosion inhibitor etc. additives and (2) which satisfies the necessary characteristics for wear resistance, load carrying capacity, heat stability and refrigerant compatibility.

In 1974, Prof. M. R. Rowland and Dr. F. S. Molina of the University of California proposed their hypothesis of destruction of the ozone layer of the stratosphere by chlorofluorocarbons. Since then, international restriction of halogen-containing refigerants, especially chlorofluorocarbons (CFC) has been planned for the purpose of protecting the environment, and investigation of substitutes for them is underway. For instance, in Japan, CFC-11, 12, 113, 114 and 115 have been designated as chlorofluorocarbons to be restricted from Jul. 1, 1989. As substitutes for them, hydrofluorocarbons such as 1,1,1,2-tetrafluoroethane (HFC-134a), 1,1,2,2-tetrafluoroethane (HFC-134), 1,1,1,2-tetrafluoro-2-chloroethane (HCFC-124), pentafluoroethane (HFC-125), 1,1-difluoro-1-chloroethane (HFC-142b), 1,1,1-trifluoroethane (HFC-143a) and 1,1-difluoroethane (HFC-152a) have been considered. As a substitute for the important refrigerant CFC-12, HFC-134a, HFC-134 and HFC-12 5 have been investigated, and employment of HFC-134a has been expected.

As a lubricating oil for a refrigerator of using a refrigerant HFC-134a, synthetic oxygen-containing hydrocarbon oils, such as esters and polyesters, which are compatible with the refrigerant, have heretofore been investigated. In particular, since synthetic ester base stocks have a better electric insulating property and a better high-temperature compatibility with the refrigerant and have other excellent characteristics of a lower hygroscopic property than do synthetic polyether oils, the synthetic ester base stocks are expected to be useful.

Use of synthetic ester base stock as a refrigerator oil is disclosed, for example, in JP-A-56-133241 and JP-A-59-164393 (the term "JP-A" as used herein means an "unexamined published Japanese patent application"); refrigerator oils of synthetic ester base stocks for specific refrigerants of chlorofluorohydrocarbons and fluorohydrocarbons are mentioned, for example, in JP-A-2-276894; and refrigerator oils of synthetic ester base stocks for specific refrigerants of hydrogen-containing fluorocarbons are mentioned, for example, in JP-A-3-88892, JP-A-3-128991 and JP-A-3-128992. Refrigerator oils composed of a synthetic ester base stock and a phosphate or phosphite are disclosed, for example, in JP-A-55-92799, JP-A-56-36570, JP-A-56-125494, JP-A-62-156198 and JP-A-3-24197; and heat pump oils composed of them are mentioned, for example, in JP-B-57-43593 (the term "JP-B" as used herein means an "examined Japanese patent publication"). In addition, refrigerator oils containing a thiophosphite, an epoxy compound and a methanesulfonate are disclosed in, for example, JP-A-56-36569, JP-A-58-15592 and JP-A-62-292895.

However, since synthetic ester base stocks are chemically more active than hydrocarbon oils, they easily form particular sludge in a compressor to cause a higher temperature. In addition, the ester oils do not have good wear resistance. Hitherto, improvement in the wear resistance and thermal stability of the ester oils by adding certain additives thereto has been investigated. However, it is still not satisfactory for preventing sludge formation and wear specific to ester oils.

SUMMARY OF THE INVENTION

An object of the present invention is to provide an ester oil for a refrigerator, which is used as a lubricating oil for refrigerators using, as a refrigerant, HFC-134a or other hydrofluorocarbons, which has satisfactory wear resistance and compatibility, and which may be used for a long period of time without forming sludge.

In order to attain this and other objects, the present inventors repeatedly tested and investigated various additives effective for preventing sludge formation specific to ester oils. As a result, they have found that addition of phosphates or phosphites to synthetic ester base stocks of dibasic acid diesters or carboxylates of polyhydric alcohols improves the compatibility with hydrofluorocarbons and wear resistance of them, and is also extremely highly effective for prevention of sludge formation under high-temperature and high-pressure condition.

Specifically, there is provided, in accordance with the present invention, a refrigerator oil composition for compressors using hydrofluorocarbons as a refrigerant, which comprises (a) a base oil component of a dibasic acid diester and/or a carboxylate of a polyhydric alcohol and (b) a phosphate and/or a phosphite, the content of which is from 5.0 to 90.0% by mass of a dibasic acid diester and/or a carboxylate of a polyhydric alcohol in the base oil component.

There is also provided in accordance with the present invention a refrigerator oil composition for compressors using hydrofluorocarbons as a refrigerant, which comprises (a) a base oil component composed of a mineral oil and/or an alkylbenzene and a dibasic acid diester and/or a carboxylate of a polyhydric alcohol and (b) a phosphate and/or a phosphite, the content of which is from 5.0 to 90.0% by mass of a dibasic acid diester and/or a carboxylate of a polyhydric alcohol in the base oil component.

Figure 1:
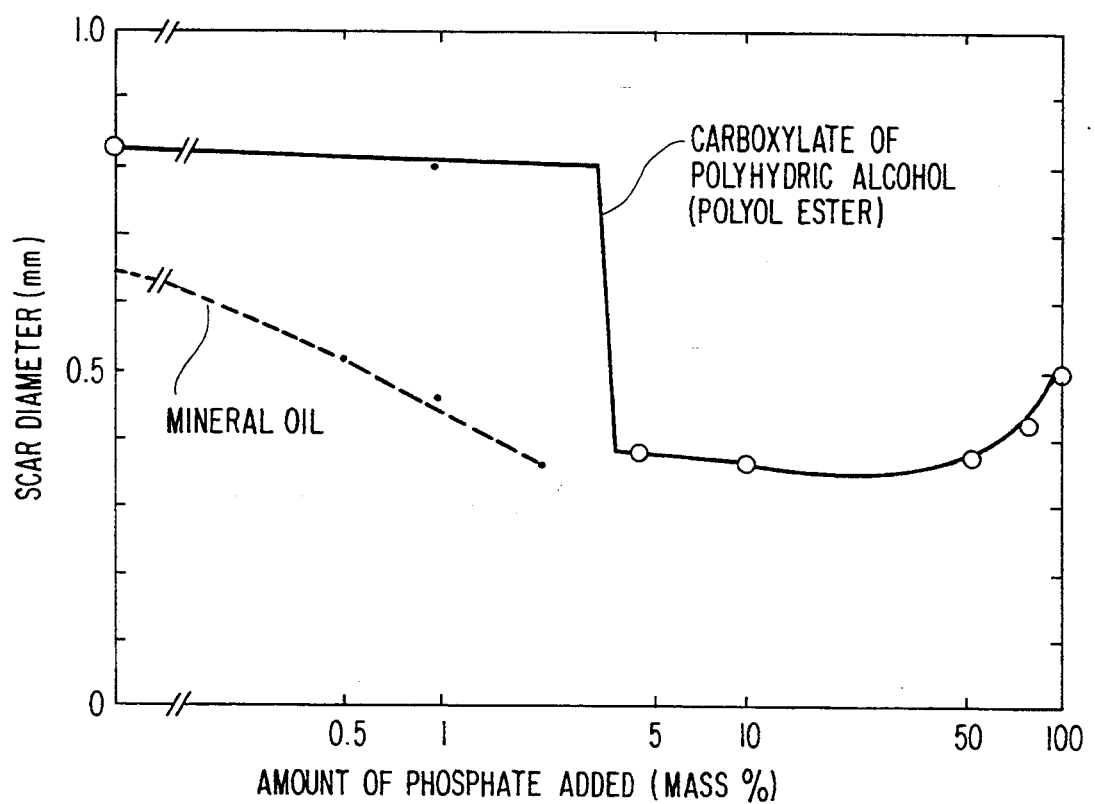
FIG. 1 is a graph showing the wear resistance improving effect of phosphate added to synthetic ester base stock (carboxylate of polyhydric alcohol).

DETAILED EXPLANATION OF THE INVENTION (1) Prevention of Sludge Formation (Thermal Stability)

Dibasic acid diesters and carboxylates of polyhydric alcohols have good thermal stability and load carrying capacity and are comparable to hydrocarbon oils with respect to the properties of conventional laboratory evaluation. However, when they are evaluated by a test under heating and sliding conditions, they are different from hydrocarbon oils and cause noticeable wear and sludge formation.

Specifically, in a sealed glass tube test (which is a conventional test method for testing thermal stability of refrigerator oils), in which, for example, one ml of an oil to be tested and one ml of HFC-134a are put and sealed in a glass tube along with Fe, Cu and Al wires each having a diameter of 1.6 mm and a length of 30 mm. The materials are heated to determine the thermal stability of the oil. Dibasic acid diesters and carboxylates of polyhydric alcohols did not significantly change or deteriorate even after heated at 200° C. for 50 days and displayed extremely excellent thermal stability. However, when they were subjected to a different thermal stability test under sliding conditions in HFC-134a atmosphere, for example, using a SRV Tester (Schwingungs Reibung und Verschleiss Tester; manufactured by OPTIMOL AG of Germany) in a HFC-134a atmosphere (5 liters/hr), at 175° C. for 2 hours, they were found to easily form black sludge. On the other hand, when hydrocarbon mineral oils and alkylbenzene were subjected to the same test, they did not change at all and did not form such sludge.

In an analysis of the formed black sludge effected by the present inventors, the sludge was found to consist essentially of an inorganic iron oxide hydroxide formed by reaction between the oxygen of the ester and iron. Thus, it was found that the reaction products of the inorganic iron oxide hydroxide was quite different from the reaction products formed from conventional refrigerator oils and refrigerants or water, for example, polymers of unsaturated hydrocarbons formed due to chlorine in the molecule of the refrigerant as shown in JP-B 57-43593 or products by corrosion of metals by the acids formed by hydrolysis of esters. Therefore, even though conventional so called chlorine-catcher agents are added to improve the thermal stability of the ester oils or even though hydrolysis is prevented by dehydration or by addition of hydrolysis inhibitors, formation of the black sludge could not be prevented.

In order to overcome the problem of black sludge formation, the present inventors discovered that phosphates and/or phosphites are effective for preventing black sludge formation.

(2) Lubricative Property:

For evaluation of the lubricative property of refrigerator oils, load value in Falex Method (ASTM D3233, Method A, Method B) is often employed. Extreme pressure property of synthetic ester base stocks is good.

For instance, in Method A of Falex Method, the load value of most synthetic ester base stocks is more than 1000 lbs (4448 N) while that of hydrocarbon oils having the same viscosity is from 300 lbs (1334N) to 500 lbs (2224N).

However, since refrigerators are used for a long period of time, wear resistance of the refrigerator oils used in them is an important factor. Wear resistance of dibasic acid diesters and carboxylates of polyhydric alcohols is not better than that of hydrocarbon oils. For instance, when they are compared with each other with respect to wear resistance by a sliding test using a Shell four-ball tester (ASTM D2783), (the load being 30 kgf (294N) and the sliding time being 30 minutes), the scar diameter of the stationary ball was from 0.6 to 0.7 mm for hydrocarbon oils while it was from 0.7 to 0.8 mm for dibasic acid diesters and carboxylates of polyhydric alcohols.

For improving the wear resistance of refrigerator oils, additives may be utilized, which must not have any bad influence on the compatibility of the oils with refrigerants, the thermal stability of the oils and the parts of refrigerators to the extent possible.

Since phosphates and phosphites have low activity and high stability, they have heretofore been well known as additives to refrigerator oils. However, since they have a low solubility in hydrocarbon oils and display a satisfactory anti-wear effect on the oils even when a small amount is added to the oils, the amount of phosphates and phosphites to be added to hydrocarbon oils is generally not more than 1% by mass. On the other hand, phosphates and phosphite may dissolve in synthetic ester base stocks in any desired proportion, but when a small amount is added to the ester oils they do not display the anti-wear effect. For these reasons mentioned above, as conventional examples, phosphates and phosphites are added to ester oils along with other additives to improve the properties of the ester oils, for example, in JP-A-55-92799, JP-A-62-156198 and JP-A-3-24197; or they are used for the purpose of improving the thermal stability of ester oils essentially due to catching of chlorines in JP-A-56-125494 and JP-B-57-43593. In these examples, however, the amount of phosphates and phosphites added is not more than 5%, and only an extremely small amount is used as an additive in all of these examples. Thus, nobody has heretofore noted the anti-wear effect of phosphates and phosphites in combination with dibasic acid diesters and/or carboxylate of polyhydric alcohols.

The present inventors have discovered that addition of a determined amount of phosphates and/or phosphites to dibasic acid diesters and/or carboxylates of polyhydric alcohols displays the above-mentioned sludge prevention effect and an additional excellent anti-wear effect.

Therefore, the present invention provides a refrigerator oil composition for compressors using hydrofluorocarbons as a refrigerant, which comprises (a) a base oil component of a dibasic acid diester and/or a carboxylate of a polyhydric alcohol and (b) a phosphate and/or a phosphite, the content of which is from 5.0 to 90.0% by mass of a dibasic acid diester and/or a carboxylate of a polyhydric alcohol in the base oil component.

The present invention also provides a refrigerator oil composition for compressors using hydrofluorocarbons as a refrigerant, which comprises (a) a base oil component composed of a mineral oil and/or an alkylbenzene and a dibasic acid diester and/or a carboxylate of a polyhydric alcohol and (b) a phosphate and/or a phosphite, the content of which is from 5.0 to 90.0% by mass of a dibasic acid diester and/or a carboxylate of a polyhydric alcohol in the base oil component.

Suitable phosphates for the refrigerator oil composition of the present invention include, for example, trimethyl phosphate, triethyl phosphate, tributyl phosphate, trioctyl phosphate, tributoxyethyl phosphate, triphenyl phosphate, tricresyl phosphate, trixylenyl phosphate, cresyldiphenyl phosphate, diphenyl-orthoxenyl phosphate, octyldiphenyl phosphate, phenyl-isopropylphenyl phosphate, diphenyl-isopropylphenyl phosphate, tris(isopropylphenyl) phosphate, tris(-chloroethyl) phosphate, and tris-dichloropropyl phosphate. Among them, especially preferred are tricresyl phosphate, phenyl-isopropylphenyl phosphate, diphenyl-isopropylphenyl phosphate, and tris(isopropylphenyl) phosphate.

Suitable phosphites include, for example, triphenyl phosphite, tricresyl phosphite, tris(nonylphenyl) phosphite, triisooctyl phosphite, diphenyl-isodecyl phosphite, phenyl-diisodecyl phosphite, triisodecyl phosphite, and di-2-ethylhexyl-hydrogen phosphite. Among them, especially preferred are triisooctyl phosphite and tricresyl phosphite.

In addition, mixtures of different phosphates, mixtures of different phosphites and mixtures of phosphate(s) and phosphite(s) may also be used.

The proportion of phosphate(s) and/or phosphite(s) to be added is from 5.0 to 90.0% by mass, preferably from 5.0 to 50.0% by mass, more preferably from 5.0 to 10.0% by mass of a dibasic acid diester and/or a carboxylate of a polyhydric alcohol in the base oil component. If the proportion of the phosphate and/or the phosphite is less than 5.0% by mass, the sludge formation prevention effect and the wear resistance improving effect would not be sufficient. On the contrary, if it is more than 90% by mass, the sludge formation prevention effect would not be further improved. In addition, in view of their solubility in hydrocarbon oils, such a large amount of phosphates and/or phosphite would separate from the mixture base oil component containing the mineral oil and/or the alkylbenzene, so that a uniform oil composition could not be formed.

The base oil component for the refrigerator oil composition of the present invention is a dibasic acid diester and/or a carboxylate of a polyhydric alcohol, or mixtures of a mineral oil and/or an alkylbenzene and a dibasic acid diester and/or a carboxylate of a polyhydric alcohol. These components have low temperature fluidity and thermal stability for attaining the function as refrigerator oils.

Suitable dibasic acid diesters include, for example, products obtained by esterification or transesterification of one or more dicarboxylic acids (for example, phthalic acid, succinic acid, alkylsuccinic acid, alkenylsuccinic acid, maleic acid, azelaic acid, suberic acid, sebacic acid, fumaric acid, alkylmalonic acid, alkenylmalonic acid), and one or more monohydric alcohols (for example, butyl alcohol, hexyl alcohol, dodecyl alcohol, 2-ethylhexyl alcohol) and polyhydric alcohols (for example, ethylene glycol, diethylene glycol, propylene glycol).

Suitable carboxylates of polyhydric alcohols include, for example, products obtained by reaction of one or more polyhydric alcohols (for example, hindered alcohols such as neopentyl glycol, trimethylol propane, pentaerythritol, dipentaerythritol, tripentaerythritol; as well as ethylene glycol, diethylene glycol, propylene glycol, polyethylene glycol, polypropylene glycol, glycerin, diglycerin, polyglycerin, sorbitol, mannitol) and one or more carboxylic acids (for example, linear saturated fatty acids such as acetic acid, propanoic acid, butanoic acid, pentanoic acid, hexanoic acid, heptanoic acid, octanoic acid, nonanoic acid, decanic acid, undecanoic acid, dodecanoic acid; monoalkyl-branched fatty acids such as isobutanoic acid, 2-methylbutanoic acid, isopentanoic acid, trimethylpropanoic acid, 2-methylpentanoic acid, 3-methylpentanoic acid, 4-isocaproic acid, 8-ethylhexanoic acid, 4-propylpentanoic acid, 4-ethylpentanoic acid, 2-methyldecanoic acid, 3-methyldecanoic acid, 4-methyldecanoic acid, 5-methyldecanoic acid, 6-methyldecanoic acid, 7-methyldecanoic acid, 9-methyldecanoic acid, 6-ethylnonanoic acid, 5-propyloctanoic acid, 3-methylundecanoic acid, 6-propylnonanoic acid; and polyalkyl-branched fatty acids such as 2,2-dimethylbutanoic acid, 2,2-dimethylpentanoic acid, 2,2,3-trimethylbutanoic acid, 2,2-dimethylhexanoic acid, 2-methyl-3-ethylpentanoic acid, 2,2,3-trimethylpentanoic acid, 2,2-dimethylheptanoic acid, 2-methyl-3-ethylhexanoic acid, 2,2,4-trimethylhexanoic acid, 2,2-dimethyl-3-ethylpentanoic acid, 2,2,3-trimethylpentanoic acid, 2,2-dimethyloctanoic acid, 2-butyl-5-methylpentanoic acid, 2-isobutyl-5-methylpentanoic acid, 2,3-dimethylnonanoic acid, 4,8-dimethylnonanoic acid, 2-butyl-5-methylhexanoic acid ); as well as mixtures of these esters. Suitable carboxylates of polyhydric alcohols also include products obtained by reacting one or more of these polyhydric alcohols and mixtures of the linear saturated fatty acids, monoalkyl-branched fatty acids and/or polyalkyl-branched fatty acids.

Also suitable are complex esters as obtained by reacting monohydric and polyhydric alcohols and monocarboxylic acids and dibasic acids.

Dibasic acid diesters and carboxylates of polyhydric alcohols suitable in the present invention are generally those having a viscosity of from 5 to 1500 mm²/s (at 40° C.), an acid value of up to 1 mg KOH/g, and a water content of up to 500 ppm. In order to remove impurities, additives and water which would have any unfavorable influence on the thermal stability of the ester oils are treated. Those which are treated by distillation or filtration or which are treated with absorbents or dewatering agents to have an acid value of not more than 0.02 mg KOH/g and a water content of not more than 20 ppm are preferred.

Suitable mineral oils in the present invention are those obtained by refining lubricaing oil fractions. They are obtained by normal pressure or reduced pressure distillation of paraffin base crude oils, intermediate base crude oils and naphthene base crude oils, by a suitable combination of solvent extraction, hydrofinishing, hydrotreating, solvent dewaxing, low-temperature dewaxing, catalytic dewaxing, redistillation, sulfuric acid treating, clay treating and dehydration. Generally, one may use those having a viscosity of from 5 to 500 mm²/s (at 40° C.), a pour point of from −15° to −30° C., a sulfur content of from 0.05 to 1.0% by mass, and a total nitrogen content of from 0.002 to 0.1% by mass. For those having a viscosity of from 5 to 100 mm²/s (at 40° C.) which are used in refrigerator operated under particularly severe conditions, a pour point is desired to be not higher than −35° C., a sulfur content is to be not more than 0.1% by mass, and a total nitrogen content is to be not more than 0.001% by mass, for the purpose of improving their low-temperature fluidity and heat stability. More preferred are those having a sulfur content of not more -than 5 ppm and a total nitrogen content of not more than 1 ppm.

Suitable alkylbenzenes in the present invention are branched alkylbenzenes obtained from polypropylene and benzene with a hydrogen fluoride catalyst as well as linear alkylbenzenes obtained from normal paraffin and benzene with the same catalyst. In general, mono-, di- or tri-alkylbenzenes of the distillate oil or residue oil having a viscosity of from 5 to 100 mm²/s (at 40° C.) are used. These alkylbenzenes are preferably treated with clay, before use in the present invention, for the purpose of removing polymerized products or colored products which are produced during the producing step and which would have a bad influence on the thermal stability of alkylbenzenes.

The refrigerator oil composition of the present invention may contain other synthetic ester base stocks in the base oil components such as polyethers, halides of polyethers, terminal esterified products of polyethers and fluorine-containing oils, but only within a range satisfying the properties needed for a refrigerator oil.

It may also contain various refrigerator oil additives such as antioxidant, a metal deactivator, a thermal stability improving agent, an extreme pressure agent, an anti-wear agent and a defoaming agent. As the antioxidant, one may use hindered phenols, amines and sulfur-containing compounds, including, for example, 2,6-di-t-butyl-4-methylphenol, 4,4′-methylene-bis(2,6-di-t-butylphenol), 2,2′-thiobis(4-methyl-6-t-butylphenol), trimethyl-dihydroquinone, p,p′-dioctyldiphenylamine, 3,7-dioctylphenothiazine, alkyl phenothiazine-1-carboxylates, phenyl-2-naphthylamine, 2 , 6-di-t-butyl-2-dimethyl-p-cresol, 5-ethyl-10,10′-diphenylphenazarine, and alkyl disulfides. As the metal deactivator and the thermal stability improving agent, one may use, for example, benzotriazole, mercaptobenzotriazole, allizanine, quillizanine, 2-alkylene oxides, and vinylcyclohexene dioxide; as the extreme pressure agent and the anti-wear agent, one may use, for example, alkyl or aryl phosphorothionates, halogenated hydrocarbons, halogenated carboxylic acids, metal salts of dialkyl or diaryl dithiophosphates, metal salts of dialkyl dithiocarbamates, and oil-soluble molybdenum sulfide-containing compounds; and as the defoaming agent, one may use, for example, dimethylpolysiloxane and metal salts of carboxylic acids.

EXAMPLES

The present invention will be explained in more detail by way of the following examples, which, however, are not intended to restrict the scope of the present invention. Base oils and additives used in the following inventive examples and comparative examples, as well as test methods referred to therein, are mentioned below.

1. Base Oil Components (1) As a dibasic acid diester and a carboxylate of a polyhydric alcohol (polyol ester, complex ester), commercial products each comprising the alcohol and the acid mentioned below were used.

TABLE 1

| Dibasic Acid Diester | Alcohol<br>isooctyl alcohol | Acid<br>sebacic acid |
|---|---|---|
| Carboxylate of Polyhydric Alcohol | | |
| Polyol Ester | pentaerythritol | mixture of C7-branched alkanoic acid, C8-branched alkanoic acid and C9-branched alkanoic acid |
| Complex Ester | trimethylol propane | mixture of C8-branched alkanoic acid and azelaic acid |

(2) The alkylbenzene used was ABA-H (product by Mitsubishi Petrochemical Co., Ltd.; hard type alkylbenzene).

(3) The mineral oil used was a paraffin mineral oil (ISOVG32, with viscosity index of 108 and sulfur content of 0.01% by mass).

2. Additives

The additives used were tricresyl phosphate (product by Daihachi Chemical Co.) and triisooctyl phosphite (product by Sakai Chemical Industrial Co.).

The amount of additives showing Table 2 is % by mass of dibasic acid diester or carboxylate of polyhydric alcohol as 100%.

3. Test Methods

The object of the present invention is to overcome the problems of sludge formation and wear, which are specific to synthetic ester base stocks. Sludge formation, if any, resulting from the use of the oil composition samples of the inventive examples and comparative examples was examined with the above mentioned SRV Tester (manufactured by OPTIMOL AG of Germany), by which the presence or absence of sludge around the sliding parts of the disc specimen was checked. The wear resistance of the oil composition samples was tested with a Shell type four-ball tester, by which the scar diameter of each ball was measured.

(1) Measurement of Viscosity

Viscosity was measured in accordance with JIS K2283.

(2) SRV Test

A disc and a ball each made of SUJ-2 were used as test specimen and were subjected to a wear test under the conditions mentioned below. The presence or absence of sludge on the surface of the disc was examined after the test.

Test Conditions

The amount of the oil sample to be tested was one drop. The amplitude of the swing of the tester was 1 mm. The test temperature was 175° C. The test time was 2 hours. The test atmosphere was HFC-134a gas introduced into the tester in a flow rate of 5 liters/hr.

(3) Four-ball Test

This was effected in accordance with ASTM D2783 in the manner mentioned below.

HFC-134a gas was blown into the center of the lower balls via a capillary at a flow rate of 5 liters/hr, and the test was effected for 30 minutes under the condition of a load of 30 kgf (294 N) and a rotation number of 1500 rpm. After the test, the scar diameter of each of the three stationary balls was measured, and the mean value per one ball was obtained from the measured values.

4. Test Results (1) FIG. 1 shows the wear resisting effect of a phosphate added to a synthetic ester base stock (carboxylate of polyhydric alcohol).

From the graph in FIG. 1, it is understood that the phosphate added to a mineral oil displayed the wear resisting effect in proportion to the amount of the phosphate added to the oil, while in the case of the present invention the effective lowermost limit of the amount of the phosphate added to the synthetic ester base stock (carboxylate of polyhydric alcohol) is larger than the amount thereof added to the mineral oil. It is also understood that in the case of the present invention, the anti-wear effect of the phosphate added to the synthetic ester base stock becomes critically remarkable when the amount of the phosphate added to the oil is more than a determined value.

(2) Table 2 below shows the test results for the inventive examples and comparative examples.

TABLE 2

| | Oil Tested | | | Viscosity | | Scar Diameter |
|---|---|---|---|---|---|---|
| | Base Oil | Additive(*) | Amount of Additive (% by mass) | mm²/s (40° C.) | Sludge Formation in SRV Test | (mm) in Four-Ball Test |
| Example 1 | dibasic acid diester 100% | TCP | 10 | 12.4 | no | 0.37 |
| Example 2 | dibasic acid diester 100% | TCP | 50 | 15.2 | no | 0.41 |
| Example 3 | dibasic acid diester 100% | TCP | 80 | 18.2 | no | 0.46 |
| Example 4 | dibasic acid diester 100% | TOPi | 10 | 11.1 | no | 0.36 |
| Example 5 | dibasic acid diester 100% | TOPi | 50 | 8.6 | no | 0.41 |
| Example 6 | dibasic acid diester 100% | TOPi | 80 | 7.3 | no | 0.41 |
| Comparative Example 1 | dibasic acid diester 100% | — | | 11.9 | yes | 0.80 |
| Comparative Example 2 | dibasic acid diester 100% | TCP | 4 | 12.0 | yes | 0.80 |
| Comparative Example 3 | dibasic acid diester 100% | TOPi | 4 | 11.6 | yes | 0.80 |
| Example 7 | polyol ester 100% | TCP | 10 | 30.0 | no | 0.35 |
| Example 8 | polyol ester 100% | TCP | 50 | 26.0 | no | 0.38 |
| Example 9 | polyol ester 100% | TCP | 80 | 23.0 | no | 0.42 |
| Example 10 | polyol ester 100% | TOPi | 10 | 27.0 | no | 0.35 |
| Example 11 | polyol ester 100% | TOPi | 50 | 12.7 | no | 0.37 |
| Example 12 | polyol ester 100% | TOPi | 80 | 8.3 | no | 0.41 |
| Comparative Example 4 | polyol ester 100% | — | | 31.0 | yes | 0.81 |
| Comparative Example 5 | polyol ester 100% | TCP | 4 | 30.6 | yes | 0.36 |
| Comparative Example 6 | polyol ester 100% | TOPi | 4 | 28.6 | yes | 0.78 |
| Example 13 | complex ester 100% | TCP | 10 | 31.0 | no | 0.35 |
| Example 14 | complex ester 100% | TCP | 50 | 26.3 | no | 0.37 |
| Example 15 | complex ester 100% | TCP | 80 | 23.1 | no | 0.41 |
| Example 16 | complex ester 100% | TOPi | 10 | 25.9 | no | 0.36 |
| Example 17 | complex ester 100% | TOPi | 50 | 12.6 | no | 0.38 |
| Example 18 | complex ester 100% | TOPi | 80 | 8.2 | no | 0.41 |
| Comparative Example 7 | complex ester 100% | — | | 32.2 | yes | 0.71 |
| Comparative Example 8 | complex ester 100% | TCP | 4 | 31.7 | yes | 0.71 |
| Comparative Example 9 | complex ester 100% | TOPi | 4 | 29.5 | yes | 0.71 |
| Example 19 | polyol ester 90% + mineral oil 10% | TCP | 10 | 30.2 | no | 0.41 |
| Example 20 | polyol ester 90% + mineral oil 10% | TCP | 50 | 26.5 | no | 0.41 |
| Example 21 | polyol ester 90% + mineral oil 10% | TCP | 80 | 23.8 | no | 0.40 |
| Example 22 | polyol ester 90% + | TOPi | 10 | 26.0 | no | 0.40 |

TABLE 2-continued

| | Oil Tested | | | Viscosity | | Scar Diameter |
| --- | --- | --- | --- | --- | --- | --- |
| | Base Oil | Additive(*) | Amount of Additive (% by mass) | mm²/s (40° C.) | Sludge Formation in SRV Test | (mm) in Four-Ball Test |
| Example 23 | polyol ester 90% + mineral oil 10% | TOPi | 50 | 13.8 | no | 0.40 |
| Example 24 | polyol ester 90% + mineral oil 10% | TOPi | 80 | 9.0 | no | 0.42 |
| Comparative Example 10 | polyol ester 90% + mineral oil 10% | — | | 31.1 | yes | 0.65 |
| Comparative Example 11 | polyol ester 90% + mineral oil 10% | TCP | 4 | 30.8 | yes | 0.65 |
| Comparative Example 12 | polyol ester 90% + mineral oil 10% | TOPi | 4 | 29.2 | yes | 0.61 |
| Example 25 | polyol ester 90% + alkylbenzene 10% | TCP | 10 | 30.9 | no | 0.43 |
| Example 26 | polyol ester 90% + alkylbenzene 10% | TCP | 50 | 26.9 | no | 0.43 |
| Example 27 | polyol ester 90% + alkylbenzene 10% | TCP | 80 | 24.0 | no | 0.46 |
| Example 28 | polyol ester 90% + alkylbenzene 10% | TOPi | 10 | 26.5 | no | 0.40 |
| Example 29 | polyol ester 90% + alkylbenzene 10% | TOPi | 50 | 13.9 | no | 0.42 |
| Example 30 | polyol ester 90% + alkylbenzene 10% | TOPi | 80 | 9.3 | no | 0.45 |
| Comparative Example 13 | polyol ester 90% + alkylbenzene 10% | — | | 31.9 | yes | 0.70 |
| Comparative Example 14 | polyol ester 90% + alkylbenzene 10% | TCP | 4 | 31.6 | yes | 0.70 |
| Comparative Example 15 | polyol ester 90% + alkylbenzene 10% | TOPi | 4 | 30.0 | yes | 0.71 |
| Comparative Example 16 | — | TCP | 100 | 21.1 | yes | 0.48 |
| Comparative Example 17 | — | TOPi | 100 | 6.5 | yes | 0.45 |

(*)TCP: Tricresyl Phosphate,
TOPi: Triisooctyl Phosphite

From the results in Table 2 above, the following facts are evident. Examples 1 to 6 (where the base oil component comprised 100% dibasic acid diester) showed an excellent sludge formation inhibiting effect and the anti-wear effect of the additive. On the other hand, in Comparative Examples 1 to 3 (where the amount of the additive phosphate or phosphite was less than 5% by mass of the base oil component) and Comparative Examples 16 and 17 (where the amount of the additive phosphate or phosphite was 100% by mass of the same), sludge was formed and the wear resistance was low.

In Examples 7 to 12 (where the base oil component comprised 100% carboxylate of polyhydric alcohol (polyol ester)) and Examples 13 to 18 (where the base oil component comprised 100% carboxylate of polyhydric alcohol (complex ester)), no sludge was formed and the wear resistance was good. On the other hand, in Comparative Examples 4 to 6 and 7 to 9 (where the amount of the additive phosphate or phosphite was less than 5% by mass of the base oil component), sludge was formed and the wear resistance was low except for Comparative Example 5

In Examples 19 to 24 (where the base oil component comprised 90% carboxylate of polyhydric alcohol (polyol ester) and 10% mineral oil) and Examples 25 to 30 (where the base oil component comprised 90% carboxylate of polyhydric alcohol (polyol ester) and 10% alkylbenzene), no sludge was formed and the wear resistance was good. On the other hand, in Comparative Examples 10 to 12 and 13 to 15 (where the amount of the additive phosphate or phosphite was less than 5% by mass of a carboxylate of polyhydric alcohol in the base oil component), sludge was formed and the wear resistance was low.

The refrigerator oil composition of the present invention is composed of (a) a base oil component comprising one or more of dibasic acid diesters and carboxylates of polyhydric alcohols (polyol esters or complex esters) and optionally one or more of mineral oils and alkylbenzenes and (b) an additive comprising one or more of phosphates and phosphites.

The above-mentioned inventive examples illustrate the combination of a dibasic acid diester and a phosphate or phosphite; the combination of a carboxylate of a polyhydric alcohol (polyol ester or complex ester) and a phosphate or phosphite; the combination of a carboxylate of a polyhydric alcohol (polyol ester), a mineral oil and a phosphate or phosphite; and the combination of a carboxylate of a polyhydric alcohol (polyol ester), an alkylbenzene and a phosphate or phosphite. All of them showed excellent test results. Combinations other than those illustrated also showed excellent test results like the illustrated inventive examples.

As has been explained in detail above, the refrigerator oil composition of the present invention is used as a lubricating oil for refrigerators using, as a refrigerant, HFC-134a and other hydrofluorocarbons which are being investigated worldwide as substitutes for conventional halogen-containing refrigerants to protect the global environment.

The refrigerator oil composition of the present invention consists essentially of a base oil component of a synthetic ester base stock and contains a specific amount of an additive of a phosphate and/or a phosphite; and it has excellent characteristics of a synthetic ester base stock with respect to its electric insulating property, high-temperature compatibility with refrigerants and lower hygroscopic property and is free from the drawbacks of a synthetic ester base stock of sludge formation and wear.

The refrigerator oil composition of the present invention is used as a lubricating oil for refrigerators using, as a refrigerant, hydrofluorocarbons, for preventing sludge formation and wear. It may be used continuously for a long period of time, having excellent thermal stability and compatibility with refrigerants.

In accordance with the use, the particular base oil components and the additives as well as their proportion may suitably be selected to prepare various oil compositions applicable to various refrigerators-.

While the invention has been described in detail and with reference to specific embodiments thereof, it will be apparent to one skilled in the art that various changes and modifications can be made therein without departing from the spirit and scope thereof.

What is claimed is:

1. A refrigerator oil composition for compressors using hydrofluorocarbons as a refrigerant, said composition consisting essentially of (a) a base oil component of a dibasic acid diester and/or a carboxylate of a polyhydric alcohol and (b) a phosphate and/or a phosphite, the content of which is from 5.0 to 90.0% by mass of a dibasic acid diester and/or a carboxylate of a polyhydric alcohol in the base oil component.

2. The refrigerator oil composition as claimed in claim 1, in which the content of a phosphate and/or a phosphite is from 5.0 to 50.0% by mass of a dibasic acid diester and/or a carboxylate of a polyhydric alcohol in the base oil component.

3. The refrigerator oil composition as claimed in claim 1, in which the content of a phosphate and/or a phosphite is from 5.0 to 10.0% by mass of a dibasic acid diester and/or a carboxylate of a polyhydric alcohol in the base oil component.

4. The refrigerator oil composition as claimed in claim 1, in which the phosphate is a tricresyl phosphate, a phenyl-isopropylphenyl phosphate, a diphenyl-isopropylphenyl phosphate or a tris(isopropylphenyl) phosphate, or a combination thereof.

5. The refrigerator oil composition as claimed in claim 1, in which the phosphite is a triisooctyl phosphite or a tricresyl phosphite, or a combination thereof.

* * * * *